(12) United States Patent
Boothroyd et al.

(10) Patent No.: US 9,297,666 B2
(45) Date of Patent: Mar. 29, 2016

(54) AUTOMATICALLY GENERATING ROUTE DIRECTIONS BASED ON SIGNPOST DATA

(71) Applicant: GLOBALFOUNDRIES Inc., Grand Cayman (KY)

(72) Inventors: Richard Boothroyd, Cambridge (GB); Robert L. Kerr, Cambridge (GB); Michael P. Kirwan, Cambridge (GB); Kevin J. Sayer, Cambridge (GB)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 14/462,112

(22) Filed: Aug. 18, 2014

(65) Prior Publication Data
US 2015/0066367 A1    Mar. 5, 2015

(30) Foreign Application Priority Data
Sep. 5, 2013   (GB) .................................. 1315778.9

(51) Int. Cl.
*G01C 21/36* (2006.01)
(52) U.S. Cl.
CPC ........ *G01C 21/3644* (2013.01); *G01C 21/3602* (2013.01); *G01C 21/3626* (2013.01)
(58) Field of Classification Search
CPC ........... G01C 21/3644; G01C 21/3626; G01C 21/3602
USPC .......................................................... 701/533
See application file for complete search history.

(56) References Cited

U.S. PATENT DOCUMENTS

| 5,559,707 A | 9/1996 | DeLorme et al. |
| 5,802,492 A | 9/1998 | DeLorme et al. |
| 6,876,921 B2 | 4/2005 | Omi |
| 2005/0255861 A1 | 11/2005 | Wilson et al. |
| 2006/0184323 A1 | 8/2006 | Park |

(Continued)

FOREIGN PATENT DOCUMENTS

| EP | 1318379 | 6/2003 |
| JP | 2008305042 | 12/2008 |

(Continued)

OTHER PUBLICATIONS

Machine Translation of WO 2014012768; Jan. 2014.*

(Continued)

*Primary Examiner* — Rodney Butler
*Assistant Examiner* — Anne Mazzara
(74) *Attorney, Agent, or Firm* — Heslin Rothenberg Farley & Mesiti P.C.

(57) ABSTRACT

A method, system, and/or computer program product automatically generates route directions based on signpost data. A calculated route from an origin to a destination includes multiple decision points where a user has more than one option to take. Geo-stamped images of signposts located at each decision point from the multiple decision points are received, and one or more series of signposts is compiled, where each series has a common signpost content. Conflicts in any overlapping series are resolved by using a measure of relative density of signpost content, and one or more decision points of the calculated route are replaced with instructions referring to the common signpost content of the series of signposts. Geo-stamped images of signposts of the series of signposts having the common signpost content are then displayed in a motor vehicle.

20 Claims, 5 Drawing Sheets

(56) References Cited

U.S. PATENT DOCUMENTS

| | | |
|---|---|---|
| 2010/0191465 A1 | 7/2010 | Noll et al. |
| 2010/0250126 A1 | 9/2010 | Epshtein et al. |
| 2011/0082640 A1 | 4/2011 | Bohme et al. |
| 2012/0245849 A1 | 9/2012 | Carsten-Christian et al. |

FOREIGN PATENT DOCUMENTS

| | | |
|---|---|---|
| WO | 2008153256 | 12/2008 |
| WO | 2009016402 | 2/2009 |
| WO | 2014012768 A1 | 1/2014 |

OTHER PUBLICATIONS

Environmental Systems Research Institute, Inc., "Setting Signposts for Directions", webhelp.esri.com, ESRI, Inc., last modified Mar. 2, 2010, retrieved Aug. 18, 2014, pp. 1-4.

Cairngorms National Park Authority, "Design Guidance for Directional Path Signs: Cairngorms National Park", CNPA, 2009, pp. 1-20.

* cited by examiner

AUTOMATICALLY GENERATING ROUTE DIRECTIONS BASED ON SIGNPOST DATA

BACKGROUND

This invention relates to the field of automatically generated route directions. In particular, the invention relates to automatically generating route directions based on signpost data.

Current way-finding solutions are capable of generating highly accurate sets of directions which are commonly communicated as written instructions or via satellite navigation devices. While automatically generated directions are accurate, they are often unnecessarily complicated and lack the natural simplicity of directions exchanged verbally between two people.

For example, a generated set of directions for the journey from Cambridge to Walthamstow, London would probably include a long series of steps detailing each turn needed to get onto the motorway and a similar series for the end of the journey. However, a person might reply "take the M11 motorway and follow signs for Walthamstow".

One solution is to rely on user-generated directions as they are the closest match to person to person verbal communication. However, this solution does not scale and relies entirely on the willingness and ability of users to contribute accurate content.

Therefore, there is a need in the art to address the aforementioned problems.

SUMMARY

A method, system, and/or computer program product automatically generates route directions based on signpost data. A calculated route from an origin to a destination includes multiple decision points where a user has more than one option to take. Geo-stamped images of signposts located at each decision point from the multiple decision points is received, and one or more series of signposts is compiled, where each series has a common signpost content. Conflicts in any overlapping series are resolved by using a measure of relative density of signpost content, and one or more decision points of the calculated route are replaced with instructions referring to the common signpost content of the series of signposts. Geo-stamped images of signposts of the series of signposts having the common signpost content are then displayed in a motor vehicle.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

Figure 1:
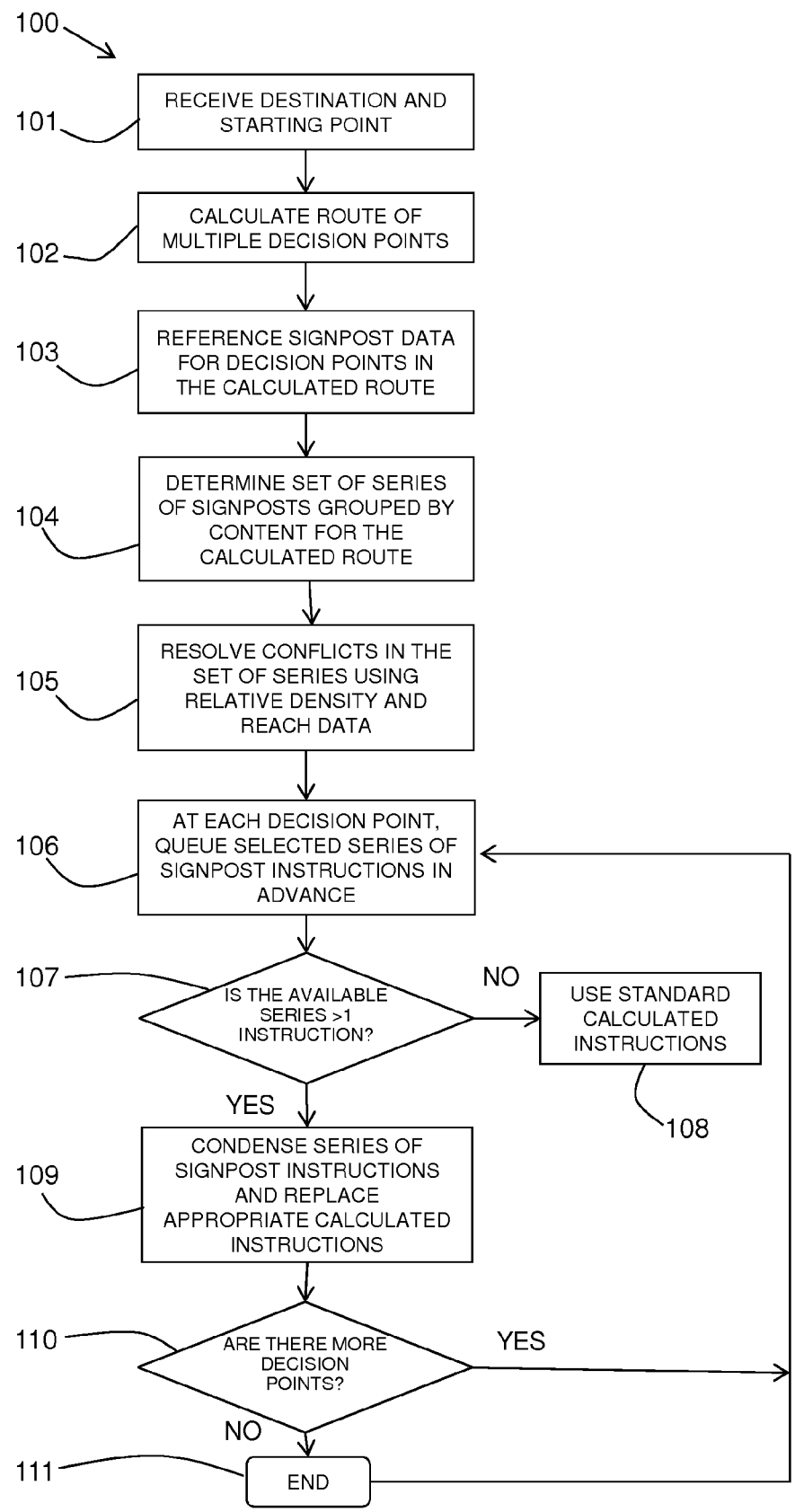
FIG. 1 is a flow diagram of an example embodiment of an aspect of a method in accordance with the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are provided for enhancing calculated route directions based on physical signpost data.

Physical signposts are globally pervasive as a means for locating destinations. They are generally produced in standard formats, meaning it is possible to use word recognition technology to capture geo-stamped images of all road signs and convert the content into a database of geo-stamped destinations.

By referencing this data, way-finding solutions may articulate directions using statements which rely on signposts such as "follow signs to XXXX".

Referring to FIG. 1, a flow diagram 100 shows an example embodiment of the described method.

A computer-implemented way-finding method may be provided, for example, on a navigation device, computer, mobile computer, or phone, via an application or web site.

The method may receive 101 a destination as input by a user from a starting place, wherein the starting place may be input by the user or automatically determined by a location determining device such as a global positioning system (GPS).

A calculated route in the form of a list of directions, with each direction being provided at a decision point in the route, may be calculated 102 using known way-finding methods. Like for example, referring to the physical attributes of the reference map, such as stating "at the roundabout take the 2nd exit". A decision point may be where a user has more than one option of route to take.

Steps 101 and 102 may be carried out by a known route calculating device and the calculated route may be supplied for further processing to provide reference to signpost data.

The described method may reference 103 signpost data. Signpost data may be generated from geo-stamped images of road signs including which names and road numbers may be automatically recognized using word recognition technology.

Signpost data may be referenced to determine 104 a set of series of signposts grouped by their content that direct the driver along the calculated route. The set of the series of signposts may be generated based on rules preserving the longest consecutive series of signposts with the same content referencing a place name or road name.

Conflicts may be resolved 105 in the set of series of signposts where multiple options could be given, with reference to scores for relative density and reach. The described method may assign scores to a destination to capture the aspects of the relative density of signposts relating to the destination and the reach of the signposts radiating from the destination.

Alternatively, conflicts may be resolved by selecting the location closest to the final destination or by selecting the largest of the conflicting locations. If available, the physical attributes of the signpost, such as font size could also be used to determine which is the most appropriate destination to follow.

These aspects are defined further below.

"Relative density" is a value that describes how many signposts point to a place relative to its size. This may be calculated as the number of signposts for a destination divided by the size of the destination.

"Reach" is a value that describes the distance between the location and the furthest signpost pointing to it.

The selected series of signpost instructions may be queued 106 in advance of each decision point. Upon arrival at each decision point, it may be determined 107 if the number of signpost instructions in the available series is greater than one. If it is greater than one, then the series of signposts may be condensed 109 into a signpost based instruction and provided.

Known systems often have a system for delivering reminder instructions between decision points. Therefore, while it is not necessary to repeat the signpost instructions at each decision point, some systems may opt to do so.

In one embodiment, if the number of signpost instructions in the series is equal to or less than one, the standard calculated instruction may be provided 108. It may be unhelpful to provide signpost-based instructions if each consecutive instruction references a different signpost. However, when the series of signposts pointing to a specific location is greater than one, the signpost-based instruction should be given.

In another embodiment, the signpost instruction may be given even if there is only one signpost instruction in the series.

It may then be determined 110 if there are any more decision points. If so, the method may loop to process the next decision point, otherwise, the method may end 111. Once the signpost-based instruction is delivered, no more instructions need be given until the next decision point at which the current instruction no longer applies.

Signposts to the intermediate destinations may be en route to the final destination, as the calculated route is not changed, only the directions given. In cases in which multiple signposts point to the target destination, the selection may be a function of each intermediate destination's reach and distance from the target.

By calculating these aspects, multiple steps in instructions may be simplified in a final set of directions while at the same time making it easier to accurately locate the destination.

Figure 2:
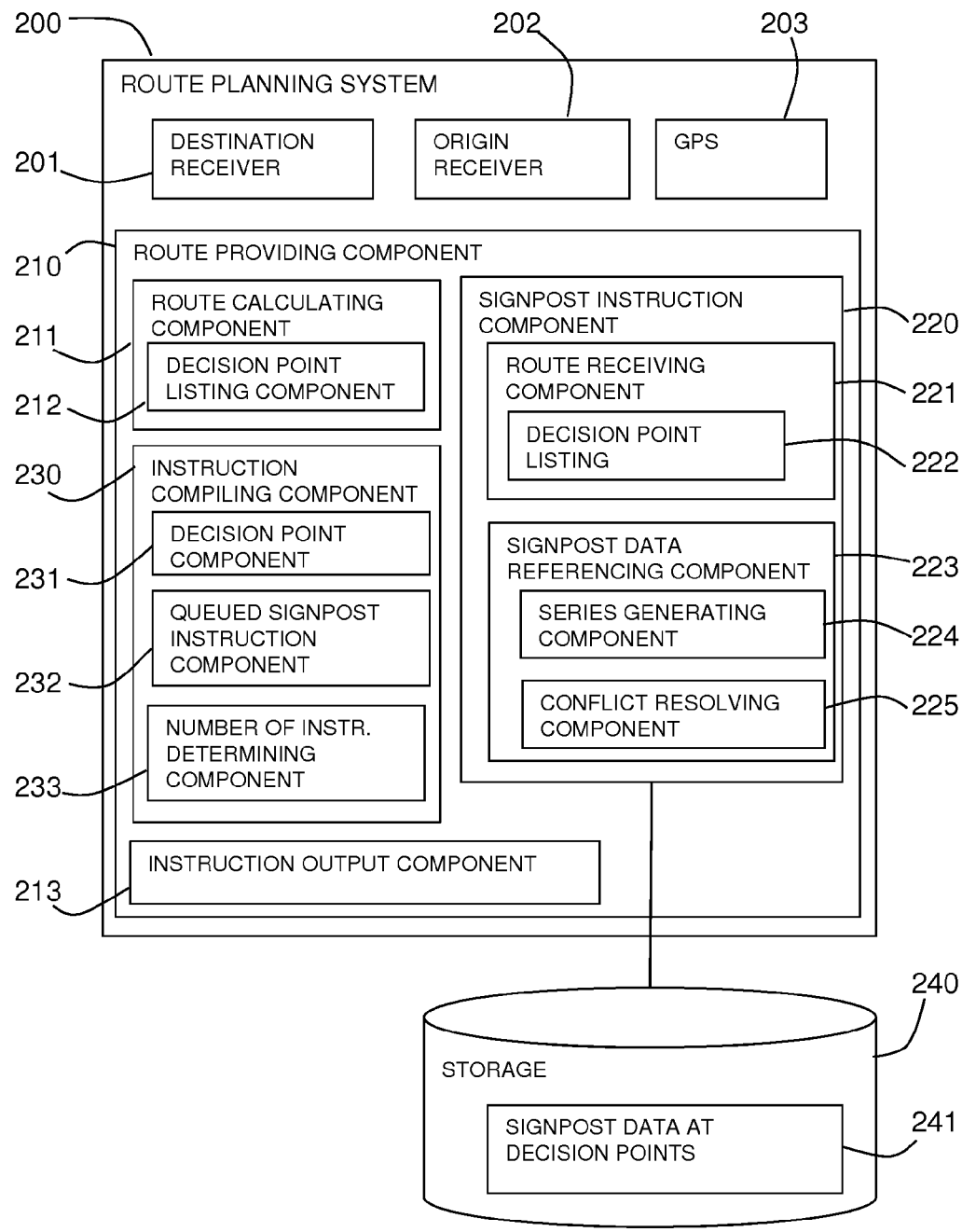
FIG. 2 is block diagram of an example embodiment of a system in accordance with the present invention.

Referring to FIG. 2, a block diagram 200 may show an example embodiment of the described system.

A route planning system 200 may be provided in the form of a navigation device, computer, mobile computer, phone or other device, via an application or web site. The route planning system 200 may include a destination receiver 201 for receiving an input from a user of the required destination, and an origin receiver 202 which provides an indication of where the user currently is located or where they would like the route instructions to begin. The origin receiver 202 may use a global positioning system (GPS) device 203 for obtaining the current location of the device the user is using.

The route planning system 200 may include a route calculating component 211 for automatically calculating a route from the origin to the destination resulting in a list of decision points listed by a decision point listing component 212. The route calculating component 211 may use know method of calculating a route and providing instructions from each decision point to the next decision point until the destination is reached.

A signpost instruction component 220 may include a route receiving component 221 for receiving the calculated route from the route calculating component 211. The route receiving component 221 may also include a decision point listing 222 from the decision point listing component 212. The signpost instruction component 220 may also include a signpost data referencing component 223 for referencing stored signpost data 241 provided for decision points and stored in a storage medium 240. The stored signpost data 241 may be retrieved from a remote location by the signpost data referencing component 223.

The signpost data referencing component 223 may include a series generating component 224 for generating a set of series of signposts grouped by their content that direct the driver along the calculated route. The set of the series of signposts may be generated based on rules preserving the longest consecutive series of signposts with the same content referencing a place name or road name.

The signpost data referencing component 223 may also include a conflict resolving component 225 for resolving any conflicts in the set of series of signposts where multiple options could be given, for example, with reference to scores for relative density and reach.

The route providing component 210 may include an instruction compiling component 230 which may include a decision point component 231 which considers each decision point in a decision point listing 222 for a route and determines if the instruction provided may be replaced by multiple signpost instructions. To this end, the instruction compiling component 230 may include a queued signpost instruction component 232 for queuing signpost instructions in advance of each decision point and a number of instructions determining component 233 to determine if there are greater than one signpost instructions for a decision point in which case the signpost instructions are used.

The route providing component 210 may also include an instruction output component 213 for outputting the final route instructions including series of signpost instructions replacing the calculated instructions.

Figure 3:
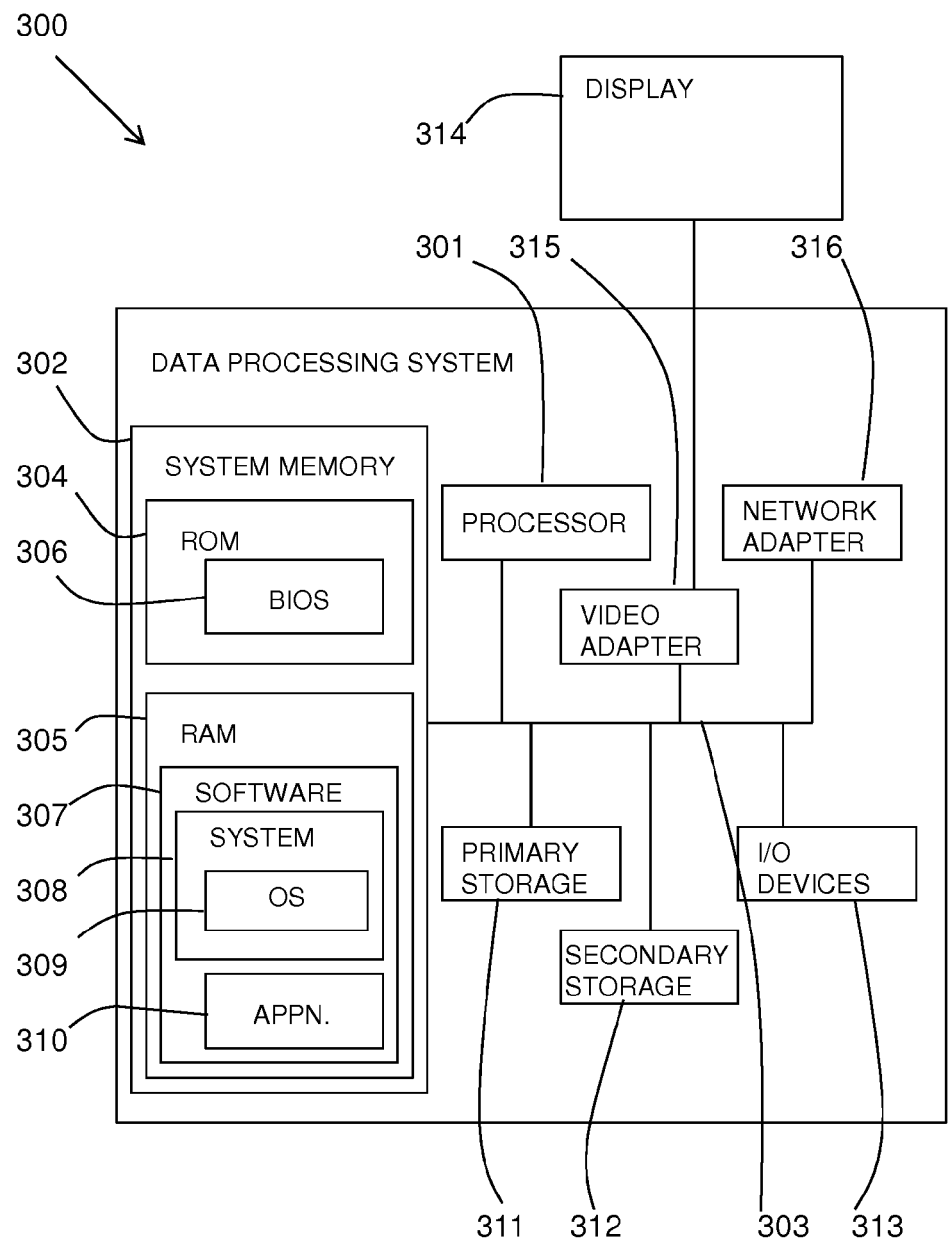
FIG. 3 is a block diagram of an embodiment of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements may include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 may be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Example 1

Based on the journey from Cambridge to Wicken Fen, there are 8 decision points at which an instruction must be given to the driver, 7 of which also feature physical signposts to keep the vehicle on the calculated route.

| Decision point | Signpost content used to stay on calculated route |
| --- | --- |
| 1 | N/A |
| 2 | A11 North (A14) |
| 3 | Ely, Newmarket, A142 |
| 4 | Ely, Soham, A142 |
| 5 | Soham |
| 6 | Ely, Soham, A142 |
| 7 | Stretham, Wicken, A1123 |
| 8 | Wicken Fen |

Figure 4A:
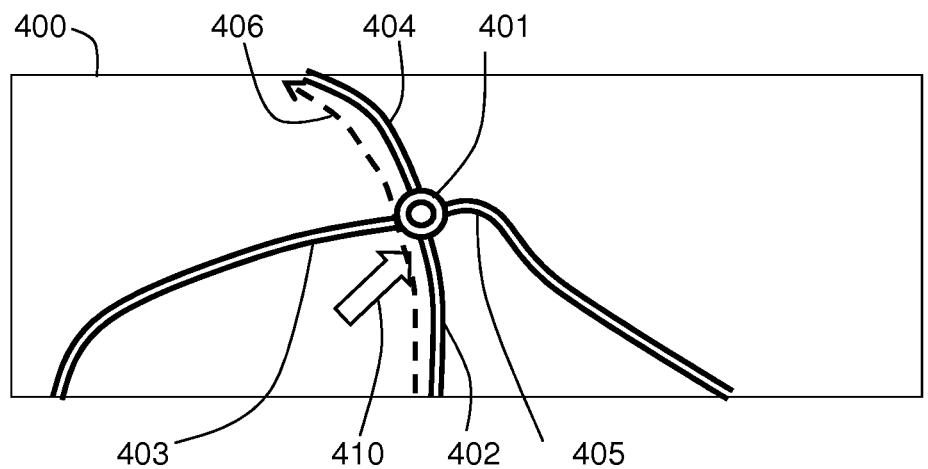
FIGS. 4A and 4B are schematic diagrams of an example embodiment of a decision point in accordance with an aspect of the present invention.
Figure 4B:
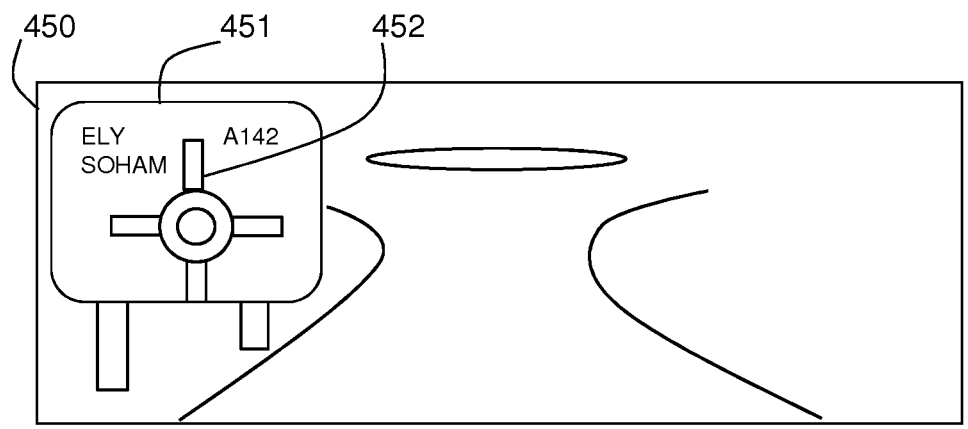

Referring to FIGS. 4A and 4B, an example illustration is provided of decision point 7 above in the form of an approach to a roundabout. FIG. 4A shows a map 400 with a roundabout 401, an approach road 402 (with an arrow 410 showing the location of the geo-stamped image) and three exits 403, 404, 405 which may be taken. The intended route is shown by the dashed line 406 which takes the second exit 404. FIG. 4B shows the visual data provided by a geo-stamped image 450 of the junction. A signpost 451 is shown with the content of "Ely", "Soham", and "A142" shown for the second exit 452 of the roundabout.

So, using signposts only, the optimal set of series of signposts is:
1. A11 North (A14) (1)
2. Ely (2) OR Newmarket (1) OR A142 (1)
3. Soham (3)
4. Stretham (1) OR Wicken (1) OR A1123 (1)
5. Wicken Fen (1)

This selection condenses the 7 decision points that feature signposts into 5 instructions and includes the longest series of 3 consecutive signposts pointing to Soham.

Destination Scores

| Destination | Size (scale of 1-10) | Number of signposts | Furthest signpost (miles) | Relative density score |
| --- | --- | --- | --- | --- |
| Ely | 4 | 37 | 14 | 9.25 |
| Newmarket | 5 | 44 | 20 | 8.8 |
| Soham | 3 | 13 | 8 | 4.3 |
| Stretham | 3 | 11 | 5 | 3.6 |
| Wicken | 2 | 8 | 3 | 4 |
| Wicken Fen | 1 | 3 | 1 | 3 |

In cases where there are multiple options, the destination with the highest combined score for reach and relative density should be selected. In this example, there is a conflict at decision point 4 where a second signpost to Ely conflicts with the first signpost to Soham. In this case, Ely has the higher destination score due to a higher relative density and reach of signs. Therefore, the two Ely signs would be used followed by the latter two Soham signs.

So, the final set of signpost-based instructions in this case would be:
A11 North (A14)
Ely (2 signposts)
Soham (2 signposts)
Standard instructions
Standard instructions Example 2

Figure 5:
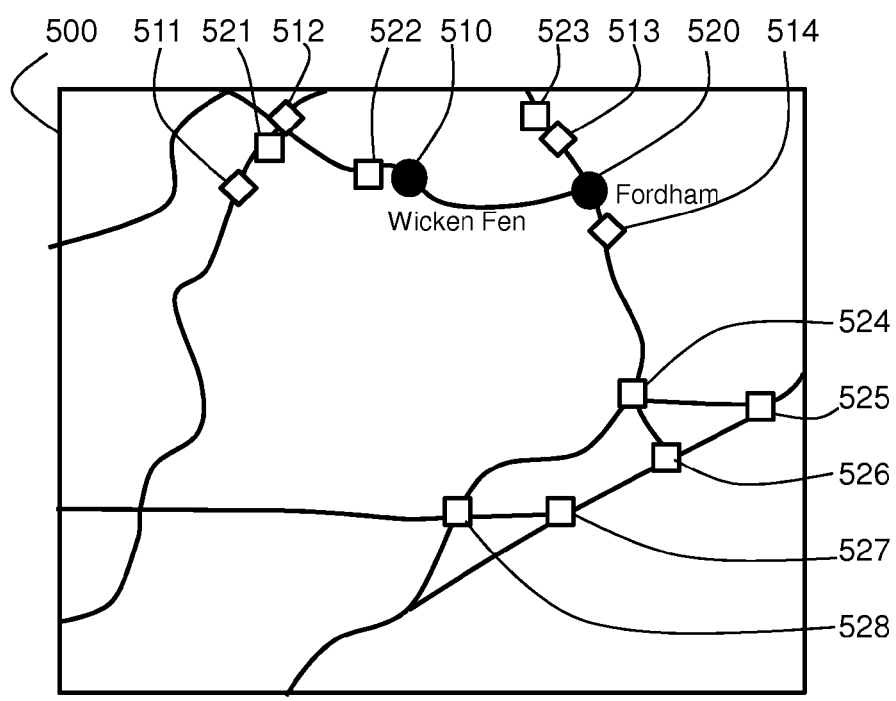
FIG. 5 is a schematic diagram showing an example embodiment of a map with signpost data in accordance with an aspect of the present invention.

Referring to FIG. 5, a map 500 shows the location of signposts for the towns of Wicken Fen 510 and Fordham 520. The signposts to Wicken Fen are shown as diamonds 511-514 and the signposts to Fordham are shown as squares 521-528.

In this example, the destination of Wicken Fen is found to have a high relative density because once a user enters close proximity there are a lot of signs. However, it has a low reach because the user needs to reach close proximity before any signs are displayed.

Fordham is close to Wicken Fen and is a larger location. As a result of its size it has a higher reach because signs are placed further away to assist way-finding. Fordham's proximity to the destination combined with its reach makes it the ideal location to reference in the directions.

Users can be advised to follow signs to Fordham, a consequence of which is that they will be taken into close proximity of Wicken Fen. The driver will be able to rely on visual cues rather than trying to interpret written or spoken directions. This is potentially a safer way of driving and also encourages the driver to learn directions rather than follow instructions. Automatically generated directions from Fulbourn to Wicken Fen National Nature Reserve may be as follows:
Head West
At the roundabout, take the 3rd exit
Turn left onto Cambridge Road
Cambridge Road turns slightly right and becomes Babraham Road
Slight left onto Dogget Lane
Slight right onto Home End
Slight right onto Balsham Road
Turn left to merge onto A11 toward Newmarket
Merge onto A14
At junction 37, take the A142 exit to Ely/Newmarket
Turn left onto Fordham Road/A142, continue to follow A142
At the roundabout, take the 1st exit onto Military Road/A1123
Turn left onto Lode Lane
Wicken Fed National Nature Reserve.

By using physical signpost data to enhance directions, the 14 steps may be reduced to 10 steps as follows:
Head West
At the roundabout, take the 3rd exit
Turn left onto Cambridge Road
Cambridge Road turns slightly right and becomes Babraham Road
Slight left onto Dogget Lane
Slight right onto Home End
Slight right onto Balsham Road
Follow signs for Fordham
Follow signs for Wicken Fen
Wicken Fen National Nature Reserve.

Steps 8 and 9 above replace steps 8 to 13 of the automatically generated instructions and are more user friendly to the driver.

A method and system are provided for automatically generating route directions based on signpost data. The method may include: receiving a calculated route from an origin to a destination including multiple decision points where a user has more than one option to take; referencing signpost data for each decision point; compiling at least one series of signposts, each series having a common signpost content; resolving conflicts in any overlapping series by using a measure of relative density of the signpost content; replacing one or more decision points of the calculated route with instructions referring to the signpost content of the series of signposts.

According to a first aspect of the present invention there is provided a method for automatically generating route directions based on signpost data, comprising: receiving a calculated route; calculating a route from an origin to a destination including multiple decision points where a user has more than one option to take; referencing signpost data for each decision point; compiling at least one series of signposts, each series having a common signpost content; resolving conflicts in any overlapping series by using a measure of relative density of the signpost content; replacing one or more decision points of the calculated route with instructions referring to the signpost content of the series of signposts.

Receiving a calculated route may include the method receiving an origin and a destination for a route and calculating the route.

The method may include resolving conflicts in any overlapping series by using a measure of reach of the signpost content.

The method may include referencing signpost data from geo-stamped images of the location of a decision point. The method may include using word recognition to determine the content of an image of a signpost. The signpost content may include place names, road names, or road numbers.

The origin may be received from a geographic positioning system.

The method may include: determining if a series of signposts includes more than one instruction; if so, replacing one or more decision points of the calculated route with instructions referring to the signpost content of the series of signposts.

The method may further include queuing a series of signpost instructions in advance of each decision point.

According to a second aspect of the present invention there is provided a system for automatically generating route directions based on signpost data, comprising: a route calculating component for calculating a route from an origin to a destination including multiple decision points where a user has more than one option to take; a signpost data referencing component for referencing signpost data for each decision point; a series generating component for compiling at least one series of signposts, each series having a common signpost content; a conflict resolving component for resolving conflicts in any overlapping series by using a measure of relative density of the signpost content; an instruction compiling component for replacing one or more decision points of the calculated route with instructions referring to the signpost content of the series of signposts.

The conflict resolving component may be for resolving conflicts in any overlapping series by using a measure of reach of the signpost content.

The signpost data referencing component may be for referencing signpost data from geo-stamped images of the location of a decision point. The signpost data referencing component may be for using word recognition to determine the content of an image of a signpost. Signpost content may include place names, road names, or road numbers.

The route calculating component may include an origin receiver for receiving an origin from a geographic positioning system.

The system may include: a number of instructions determining component for determining if a series of signposts includes more than one instruction; if so, the instruction compiling component replacing one or more decision points of the calculated route with instructions referring to the signpost content of the series of signposts.

The system may include: a queued signpost instruction component for queuing a series of signpost instructions in advance of each decision point.

According to a third aspect of the present invention there is provided a computer program product for automatically generating route directions based on signpost data, the computer program product comprising: a computer readable storage medium readable by a processing circuit and storing instructions for execution by the processing circuit for performing a method according to the first aspect of the present invention.

According to a fourth aspect of the present invention there is provided a computer program stored on a computer readable medium and loadable into the internal memory of a digital computer, comprising software code portions, when said program is run on a computer, for performing the method of the first aspect of the present invention.

According to a fifth aspect of the present invention there is provided a method substantially as described with reference to the figures.

According to a sixth aspect of the present invention there is provided a system substantially as described with reference to the figures.

The described aspects of the invention provide the advantage of reducing the gap between generated and human directions by utilizing physical signpost data.

What is claimed is:

1. A method for automatically generating route directions based on signpost data, the method comprising:
   calculating a calculated route from an origin to a destination, wherein the calculated route includes multiple decision points where a user has more than one option to take;
   receiving geo-stamped images of signposts located at each decision point from the multiple decision points;
   compiling at least one series of signposts, wherein each series has a common signpost content;
   resolving conflicts in any overlapping series by using a measure of relative density of signpost content;
   replacing one or more decision points of the calculated route with instructions referring to the common signpost content of the at least one series of signposts; and
   displaying geo-stamped images of signposts of the at least one series of signposts having the common signpost content on a display in a motor vehicle.

2. The method as claimed in claim 1, further comprising:
   resolving conflicts in any overlapping series by using a measure of reach of the signpost content.

3. The method of claim 2, wherein the reach is a value that describes a distance between the destination and a farthest signpost that points to the destination.

4. The method as claimed in claim 1, further comprising:
   referencing signpost data from geo-stamped images of the location of a decision point.

5. The method as claimed in claim 4, further comprising:
   using word recognition to determine content of an image of a signpost.

6. The method as claimed in claim 1, wherein the signpost content includes place names, road names, and road numbers.

7. The method as claimed in claim 6, wherein the origin is received from a geographic positioning system.

8. The method as claimed in claim 1, further comprising:
  determining if a series of signposts includes more than one instruction;
  in response to determining that the series of signposts includes more than one instruction, replacing one or more decision points of the calculated route with instructions referring to signpost content of the series of signposts.

9. The method as claimed in claim 1, further comprising:
  queuing a series of signpost instructions in advance of each decision point.

10. The method of claim 1, further comprising:
  calculating, by one or more processors, the measure of relative density of signpost content by dividing a quantity of signposts for the destination by a size of the destination.

11. A computer program product for automatically generating route directions based on signpost data, the computer program product comprising a computer readable storage medium having program code embodied therewith, wherein the computer readable storage medium is not a transitory signal per se, and wherein the program code is readable and executable by a processor to perform a method comprising:
  calculating a calculated route from an origin to a destination, wherein the calculated route includes multiple decision points where a user has more than one option to take;
  receiving geo-stamped images of signposts located at each decision point from the multiple decision points;
  compiling at least one series of signposts, wherein each series has a common signpost content;
  resolving conflicts in any overlapping series by using a measure of relative density of signpost content;
  replacing one or more decision points of the calculated route with instructions referring to the common signpost content of the at least one series of signposts; and
  displaying geo-stamped images of signposts of the at least one series of signposts having the common signpost content on a display in a motor vehicle.

12. The computer program product of claim 11, wherein the method further comprises:
  resolving conflicts in any overlapping series by using a measure of reach of the signpost content.

13. The computer program product of claim 11, wherein the method further comprises:
  referencing signpost data from geo-stamped images of the location of a decision point.

14. The computer program product of claim 13, wherein the method further comprises:
  using word recognition to determine content of an image of a signpost.

15. The computer program product of claim 11, wherein signpost content includes place names, road names, and road numbers.

16. The computer program product of claim 15, wherein the origin is received from a geographic positioning system.

17. The computer program product of claim 11, wherein the method further comprises:
  determining if a series of signposts includes more than one instruction;
  in response to determining that the series of signposts includes more than one instruction, replacing one or more decision points of the calculated route with instructions referring to signpost content of the series of signposts.

18. The computer program product of claim 11, wherein the method further comprises:
  queuing a series of signpost instructions in advance of each decision point.

19. A computer system comprising:
  a processor, a computer readable memory, and a computer readable storage medium;
  first program instructions to calculate a calculated route from an origin to a destination, wherein the calculated route includes multiple decision points where a user has more than one option to take;
  second program instructions to receive geo-stamped images of signposts located at each decision point from the multiple decision points;
  third program instructions to compile at least one series of signposts, wherein each series has a common signpost content;
  fourth program instructions to resolve conflicts in any overlapping series by using a measure of relative density of signpost content;
  fifth program instructions to replace one or more decision points of the calculated route with instructions referring to the common signpost content of the at least one series of signposts; and
  sixth program instructions to display geo-stamped images of signposts of the at least one series of signposts having the common signpost content on a display in a motor vehicle; and wherein
the first, second, third, fourth, fifth, and sixth program instructions are stored on the computer readable storage medium for execution by the processor via the computer readable memory.

20. The computer system of claim 19, further comprising:
  seventh program instructions to resolve conflicts in any overlapping series by using a measure of reach of the signpost content; and wherein
the seventh program instructions are stored on the computer readable storage medium for execution by the processor via the computer readable memory.

* * * * *